Patented Sept. 22, 1953

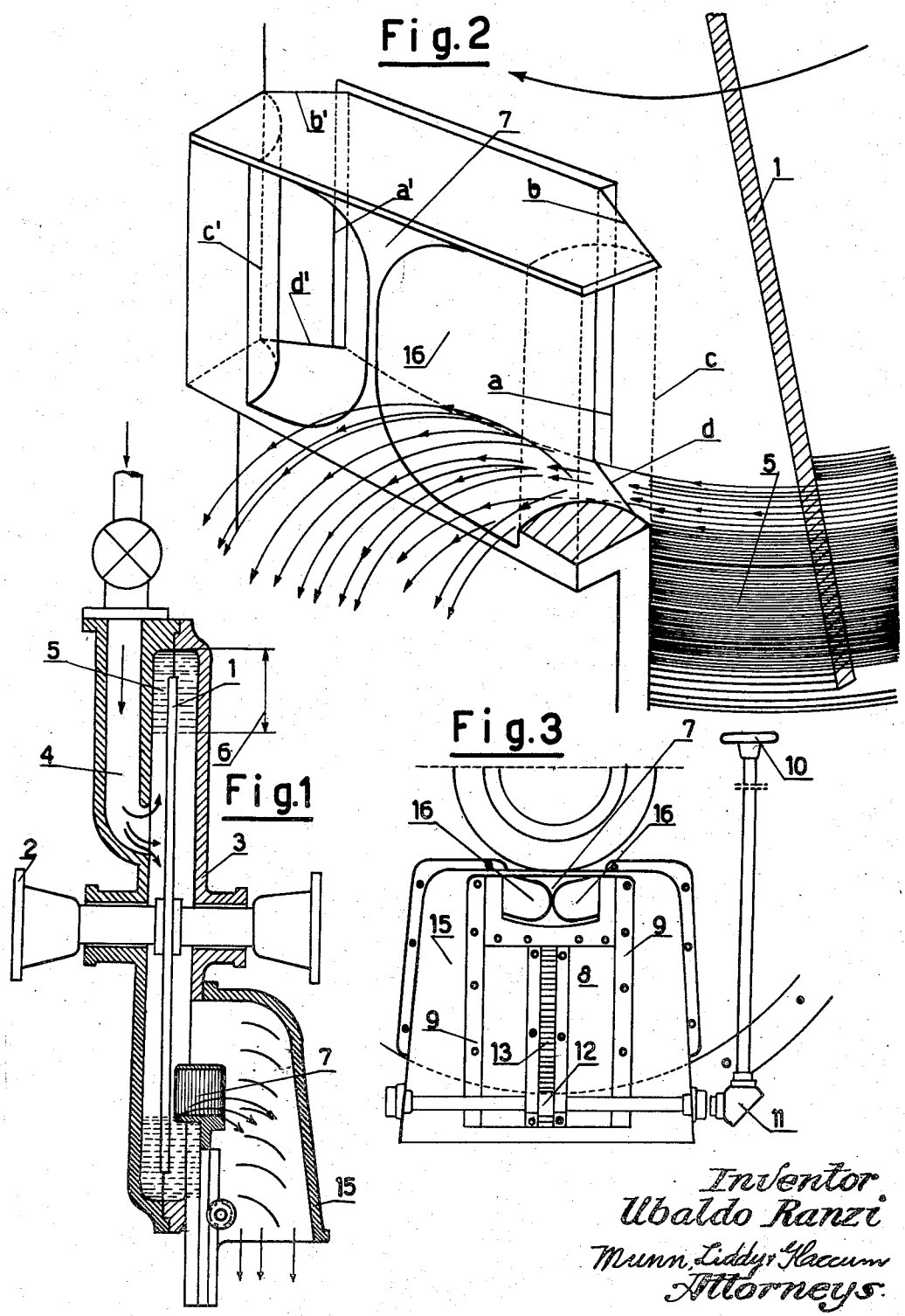

2,652,853

UNITED STATES PATENT OFFICE 2,652,853

DEVICE FOR ADJUSTING THE HEIGHT OF A RING OF FLUID, PARTICULARLY WATER, IN HYDRODYNAMIC BRAKES AND SUCH LIKE

Ubaldo Ranzi, Legnano, Italy

Application July 31, 1947, Serial No. 765,143
In Italy January 27, 1944

Section 1, Public Law 690, August 8, 1946
Patent expires January 27, 1964

1 Claim. (Cl. 137—577)

In disc type hydro-dynamometric brakes, the disc connected to the engine on trial by means of one or more couplings rotates inside the casing or stator, driving the water, which comes in from a suitable pipe, towards its periphery where it takes the shape of a ring through centrifugal force.

The water ring or rim, depending on its height, covers a more or less extended part of the disc surface and determines a greater or smaller brake effect.

Consequently, the load adjustment for the engine on trial is performed by regulating the height of the water ring, which in some cases must take place by millimeter fractions.

It is therefore necessary to provide the brake with a regulating system by which the height of the water rim can be adjusted to these exact values, limiting the spontaneous variations due to speed changes, irregularities of inflow, fluctuation from any other cause, within limits still lower than those already pointed out (0.5 mm.).

Only in this manner the brake load can be kept sufficiently constant to allow for exact adjustments and measurements.

The regulating system in conformity with the invention, generally arranged at the center on the lower part of one of the lids of the brake casing, consists of an outflow device, for instance in the shape of a nozzle, provided with one or more outflow ports for the inner surface of the water ring, such device being displaceable in a substantially radial direction respective to the brake casing. Such displacement can be obtained for instance by mounting the device on a slide running along two guides arranged at the sides of an opening radially bored in the casing and tight sealed by the above slide.

The slide can in turn be operated through a rack and toothed pinion, directly or indirectly actuated by a hand-wheel. Said pinion can however be operated by any other convenient means.

A further improvement, suggested by experience, can be embodied in the above mentioned device.

It has been indeed experimentally proved that in a brake of this type, if the rotating discs are brought nearer to the partitions (that is the discs attached to the stator), the reaction capacity of the brake is increased.

The results of experiments which have been performed show that bringing the discs nearer up to a certain limit has determined a braking action more than ten times greater than with discs normally distanced as in previous patterns.

On the other hand it must be taken into account that a brake is not exclusively utilized for the maximum power which it can absorb or check as a function of the various possible speeds up to the maximum speed, but also for all intermediate values down to the minimum permissible power at the same speeds.

The higher the maximum and the lower the minimum power, the larger is the utilization field of the machine.

If the maximum power is obtained by totally submerging the rotating brake disc or discs in water, or using the biggest water rim, the minimum power at the same speed will be obtained with the smallest water rim allowed by the hydrodynamic and mechanical properties of the machine.

The smallest ring, as mentioned above, has normally such dimensions as required for braking out at a certain speed a minimum power equal to 5% of the maximum, i. e. $5/100$.

If in the same brake the discs are brought nearer to the partitions as far as allowed by the design of the machine, the braking ratio remains unchanged because both maximum and minimum curves are raised.

In conformity with the invention, besides bringing the discs nearer, a tapering of the discs in their peripheric zone has also been introduced, with the aim of bringing the disc surfaces further apart as the water rim gets smaller, when a regulation is carried out by means of the above mentioned device.

The braking effect with minimum powers is thus brought to values equivalent to those obtained when the discs are far apart from each other.

For a better understanding, the attached drawings show in Figures from 1 to 3 a preferred embodiment of the invention, which is neither limitative nor binding.

Fig. 1 shows an axial section of a single disc brake, where the disc 1 is attached to the engine on trial by means of one of the couplings 2. The disc revolves inside the casing or stator part 3 and drives the water (or any other fluid) flowing in from pipe 4 towards the periphery in the shape of a ring 5 through centrifugal force.

The water ring, according to the height 6 which it takes on, covers a larger or smaller surface of the disc and determines a larger or smaller braking effect.

The adjustment of the load to the engine on trial depends on the height 6 of the water ring, which sometimes must be altered by millimeter fractions. The regulating device which forms the object of the present invention, provides for such adjustment. It is generally arranged in the center and at the bottom of one of the covers of the brake casing 3 and consists of a discharge element, for instance in the shape of a nozzle 7, provided with one or more openings or discharge ports, which can be displaced in a radial direction respective to the casing.

Since the nozzle must be used for both rotation senses of the brake, it is fitted (Fig. 2) with two symmetrical discharge ports, having sides marked $a$—$b$—$c$—$d$ and $a'$—$b'$—$c'$—$d'$.

The first port is used for the rotation sense shown by the arrow, the other for the opposite sense.

The sides $a$ and $d$ have a cutting edge.

The water above the level marked by edge $d$ flows into the nozzle and is conveyed towards the outside with a horizontal bend of 90° along the curved wall 16 (see Figure 2).

The nozzle is mounted on a gate or partition 8 (Figs. 3 and 4) which slides radially along the discharge opening having the same width arranged on the wall of the brake casing. The partition obstructs that part of the discharge opening which falls below the nozzle, that is where the water rim flows.

The guides 9 of the partition have a tight fit, so as to prevent any escape of water from their interstices.

The movement of the partition and nozzle is shown in Fig. 3. The partition is displaced vertically by means of handwheel 10 through the conic gears 11 and gear 12 cooperating with rack 13 of the partition.

The thickness of the water rim follows therefore rapidly the variations of the partition's level.

The excess water discharged represented by an equal volume of water introduced for cooling is projected towards the exterior and striking against the direction flaps 14 of the discharge box 15 is orientated towards the bottom, where a trough underneath the brake can collect and disperse it.

Having now particularly described and ascertained the nature of my said invention and in what manner the same is to be performed, I declare that what I claim is:

In a hydrodynamic brake water level control, a circular casing having an outlet opening in one side, a slidable partition mounted on said casing for radial movement with respect to said opening, said partition having an edge portion disposed at a right angle to the radius of the casing, means for causng the radial movement of the partition whereby the water overflows said edge portion at a predetermined distance from the axis of the casing, and a nozzle on the partition at the tip thereof for directing the flow of water laterally upward and obliquely after passing said edge portion.

UBALDO RANZI.

References Cited in the file of this patent
UNITED STATES PATENTS

| Number | Name | Date |
| --- | --- | --- |
| 703,315 | Smith | June 24, 1902 |
| 907,851 | Munson | Dec. 29, 1908 |
| 1,685,735 | Walker | Sept. 25, 1928 |
| 1,854,952 | Nilson | Apr. 19, 1932 |
| 1,972,741 | Kohl | Sept. 4, 1934 |
| 2,061,656 | Guthrie | Nov. 24, 1936 |
| 2,367,038 | Martin | Jan. 5, 1945 |